United States Patent

Harpaz

(10) Patent No.: US 12,217,421 B2
(45) Date of Patent: Feb. 4, 2025

(54) POINT OF GAZE TRACKING WITH INTEGRATED CALIBRATION PROCESS

(71) Applicant: NeuraLight Ltd., Tel Aviv (IL)

(72) Inventor: Eran Harpaz, Tel Aviv (IL)

(73) Assignee: Neuralight Ltd., Tel Aviv (IL)

(*) Notice: Subject to any disclaimer, the term of this patent is extended or adjusted under 35 U.S.C. 154(b) by 0 days.

(21) Appl. No.: 18/397,535

(22) Filed: Dec. 27, 2023

(65) Prior Publication Data

US 2024/0233119 A1 Jul. 11, 2024

Related U.S. Application Data

(60) Provisional application No. 63/437,136, filed on Jan. 5, 2023.

(51) Int. Cl.
*G06T 7/00* (2017.01)
*G06V 10/82* (2022.01)
*G06V 40/18* (2022.01)

(52) U.S. Cl.
CPC ............ *G06T 7/0012* (2013.01); *G06V 10/82* (2022.01); *G06V 40/18* (2022.01); *G06T 2207/30041* (2013.01)

(58) Field of Classification Search
CPC ........ G06T 7/0012; G06T 2207/30041; G06V 10/82; G06V 40/18
See application file for complete search history.

(56) References Cited

U.S. PATENT DOCUMENTS 6,820,979 B1   11/2004   Stark et al.
7,428,320 B2    9/2008   Northcott et al.
(Continued)

FOREIGN PATENT DOCUMENTS

CA      2618352 A1    2/2007
CN   106265006 A     1/2017
(Continued)

OTHER PUBLICATIONS

Akinyelu, A.A. and Blignaut, P., "Convolutional Neural Network-Based Technique for Gaze Estimation on Mobile Devices," Frontiers in Artificial Intelligence 4:796825 11 pages, Frontiers Media SA, Switzerland (Jan. 2022).
(Continued)

*Primary Examiner* — Tom Y Lu
(74) *Attorney, Agent, or Firm* — Sterne, Kessler, Goldstein & Fox P.L.L.C.

(57) ABSTRACT

Disclosed herein are system, method and/or computer program product embodiments, and/or combinations and sub-combinations thereof, for tracking a point of gaze of a subject in a manner that incorporates automatic eye tracking calibration. In an embodiment, video is obtained of the subject viewing content presented by a display. The video is analyzed to determine a series of time points at which a gaze of the subject is dwelling on a visual target and, for each time point in the series, a set of eye feature values. A location of a stimulus presented by the display is also obtained for each time point in the series. This information is utilized to determine a mapping that maps a set of eye feature values to a point of gaze. The mapping is used to map a set of eye features obtained by analyzing the video to the point of gaze of the subject.

30 Claims, 8 Drawing Sheets

(56) References Cited

U.S. PATENT DOCUMENTS

| | | |
|---|---|---|
| 7,753,525 B2 | 7/2010 | Hara et al. |
| 7,869,627 B2 | 1/2011 | Northcott et al. |
| 8,061,840 B2 | 11/2011 | Mizuochi |
| 8,132,916 B2 | 3/2012 | Johansson |
| 8,401,248 B1* | 3/2013 | Moon .................... G06V 40/18 382/103 |
| 9,552,061 B2* | 1/2017 | Zhang .................... G06F 3/013 |
| 9,730,582 B1* | 8/2017 | Stone .................... A61B 3/032 |
| 9,965,860 B2 | 5/2018 | Nguyen et al. |
| 10,016,130 B2 | 7/2018 | Ganesan et al. |
| 10,109,056 B2 | 10/2018 | Nguyen et al. |
| 10,231,614 B2 | 3/2019 | Krueger |
| 10,575,728 B2 | 3/2020 | Zakariaie et al. |
| 10,713,813 B2 | 7/2020 | De Villers-Sidani et al. |
| 10,713,814 B2 | 7/2020 | De Villers-Sidani et al. |
| 10,867,252 B2* | 12/2020 | Lindén .................... A61B 3/113 |
| 11,074,714 B2 | 7/2021 | De Villers-Sidani et al. |
| 11,100,323 B2 | 8/2021 | Wilhelm et al. |
| 11,382,545 B2 | 7/2022 | Zakariaie et al. |
| 11,503,998 B1 | 11/2022 | De Villers-Sidani et al. |
| 11,513,593 B2 | 11/2022 | Drozdov et al. |
| 11,514,720 B2 | 11/2022 | Haimovitch-Yogev et al. |
| 11,776,315 B2 | 10/2023 | Haimovitch-Yogev et al. |
| 12,033,432 B2* | 7/2024 | Ben-Ami .................... G06N 3/04 |
| 2005/0228236 A1 | 10/2005 | Diederich et al. |
| 2006/0110008 A1* | 5/2006 | Vertegaal ................ G06T 7/251 382/103 |
| 2007/0009169 A1 | 1/2007 | Bhattacharjya |
| 2009/0018419 A1 | 1/2009 | Torch |
| 2014/0320397 A1 | 10/2014 | Hennessey et al. |
| 2014/0364761 A1 | 12/2014 | Benson et al. |
| 2015/0077543 A1 | 3/2015 | Kerr et al. |
| 2015/0293588 A1 | 10/2015 | Strupczewski et al. |
| 2016/0150955 A1 | 6/2016 | Kiderman et al. |
| 2017/0135577 A1 | 5/2017 | Komogortsev |
| 2017/0151089 A1 | 6/2017 | Chernyak |
| 2017/0231490 A1 | 8/2017 | Toth et al. |
| 2017/0249434 A1 | 8/2017 | Brunner |
| 2017/0365101 A1* | 12/2017 | Samec .................... G06T 19/006 |
| 2017/0367633 A1* | 12/2017 | Samadani ............ A61B 5/7275 |
| 2018/0018515 A1 | 1/2018 | Spizhevoy et al. |
| 2018/0249941 A1* | 9/2018 | Liston .................... A61B 3/0041 |
| 2020/0097076 A1 | 3/2020 | Alcaide et al. |
| 2020/0268296 A1 | 8/2020 | Alcaide et al. |
| 2020/0305708 A1 | 10/2020 | Krueger |
| 2020/0323480 A1 | 10/2020 | Shaked et al. |
| 2020/0364539 A1 | 11/2020 | Anisimov et al. |
| 2020/0405148 A1 | 12/2020 | Tran |
| 2021/0174959 A1 | 6/2021 | Abel Fernandez |
| 2021/0186318 A1 | 6/2021 | Yellin et al. |
| 2021/0186395 A1 | 6/2021 | Zakariaie et al. |
| 2021/0186397 A1 | 6/2021 | Weisberg et al. |
| 2021/0327595 A1 | 10/2021 | Abdallah |
| 2022/0019791 A1 | 1/2022 | Drozdov et al. |
| 2022/0206571 A1 | 6/2022 | Drozdov et al. |
| 2022/0211310 A1 | 7/2022 | Zakariaie et al. |
| 2022/0236797 A1 | 7/2022 | Drozdov et al. |
| 2022/0301294 A1 | 9/2022 | Boutinon |
| 2022/0313083 A1 | 10/2022 | Zakariaie et al. |
| 2022/0351545 A1 | 11/2022 | Ben-Ami et al. |
| 2022/0354363 A1 | 11/2022 | Ben-Ami et al. |
| 2022/0369923 A1 | 11/2022 | De Villers-Sidani et al. |
| 2022/0390771 A1 | 12/2022 | David et al. |
| 2022/0391012 A1* | 12/2022 | Vertegaal ............... G06V 40/18 |
| 2023/0074569 A1 | 3/2023 | Drozdov et al. |
| 2023/0210442 A1* | 7/2023 | Krueger .................... A61B 3/14 600/301 |
| 2023/0233072 A1 | 7/2023 | Haimovitch-Yogev et al. |
| 2023/0334326 A1 | 10/2023 | Haimovitch-Yogev et al. |

FOREIGN PATENT DOCUMENTS

| | | |
|---|---|---|
| EP | 1947604 A1 | 7/2008 |
| WO | WO-2020235939 A2 | 11/2020 |
| WO | WO-2021097300 A1 | 5/2021 |

OTHER PUBLICATIONS

Ali, E., et al., "Pupillary Response to Sparse Multifocal Stimuli in Multiple Sclerosis Patients," Multiple Sclerosis Journal 20(7): 1-8, (Nov. 2013).

Aljaafreh, A., et al., "A Low-cost Webcam-based Eye Tracker and Saccade Measurement System," International Journal of Circuits, Systems and Signal Processing 14:102-107, (Apr. 2020).

Alnajar, F., et al., "Auto-Calibrated Gaze Estimation Using Human Gaze Patterns," International Journal of Computer Vision 124:223-236, (2017).

Bafna, T., et al., "EyeTell: Tablet-based Calibration-free Eye-typing Using Smooth-pursuit Movements," Proceedings of the ETRA '21 Short Papers, (2021).

Bedell, H., et al., "Eye Movement Testing in Clinical Examination," Vision Research 90:32-37, Elsevier Science Limited, United Kingdom (Sep. 2013).

Bijvank, J.A.N., et al., "Quantification of Visual Fixation in Multiple Sclerosis," Investigative Ophthalmology & Visual Science 60(5):1372-1383, Association for Research in Vision and Ophthalmology (Arvo), United States (Apr. 2019).

Borza, D., et al., "Real-Time Detection and Measurement of Eye Features from Color Images," Sensors 16(7):1105 1-24, MDPI, Switzerland (Jul. 2016).

Chen, S. and Epps, J., "Eyelid and Pupil Landmark Detection and Blink Estimation Based on Deformable Shape Models for Near-Field Infrared Video," Frontiers in ICT 6:18 1-11, (Oct. 2019).

Cherng, Y., et al., "Background Luminance Effects on Pupil Size Associated With Emotion and Saccade Preparation," Scientific Reports 10(1):15718 11 Pages, Nature Publishing Group, United Kingdom (Sep. 2020).

Chernov, N., et al., "Fitting Quadratic Curves to Data Points," British Journal of Mathematics & Computer Science 4(1):33-60, (2014).

De Almeida Junior, F.L., et al., "Image Quality Treatment to Improve Iris Biometric Systems," Infocomp Journal of Computer Science 16(1-2):21-30, (2017).

De Seze, J., et al., "Pupillary Disturbances in Multiple Sclerosis: Correlation With MRI Findings," Journal of the Neurological Sciences 188(1-2):37-41, Elsevier, Netherlands (Jul. 2001).

Derwenskus, J., et al., "Abnormal Eye Movements Predict Disability in MS: Two-year Follow-up," Annals of the New York Academy of Sciences 1039:521-523, Blackwell, United States (Apr. 2005).

Felmingham, K., "Eye Tracking and PTSD," Comprehensive Guide to Post-traumatic Stress Disorder Chapter 69:1241-1256, (Jan. 2015).

Ferreira, M., et al., "Using Endogenous Saccades to Characterize Fatigue in Multiple Sclerosis," Multiple Sclerosis and Related Disorders 14:16-22, Elsevier B. V., Netherlands (May 2017).

Fielding, J., et al., "Ocular Motor Signatures of Cognitive Dysfunction in Multiple Sclerosis," Nature Reviews. Neurology, 11(11):637-645, Nature Publishing Group, United Kingdom (Nov. 2015).

Fink, L., et al., "From Pre-processing to Advanced Dynamic Modeling of Pupil Data," Behavior Research Methods 37 Pages, Springer, United States (Jun. 2023).

Frohman, E.M., et al., "Quantitative Oculographic Characterisation of Internuclear Ophthalmoparesis in Multiple Sclerosis: the Versional Dysconjugacy Index Z Score," Journal of Neurology, Neurosurgery, and Psychiatry 73(1):51-55, BMJ Publishing Group, United Kingdom (Jul. 2002).

Frohman, E.M., et al., "The Neuro-Ophthalmology of Multiple Sclerosis", The Lancet Neurology, 4(2):111-121, Lancet Public Group, United Kingdom (Feb. 2005).

Frohman, T.C., et al., "Accuracy of Clinical Detection of INO in MS: Corroboration With Quantitative Infrared Oculography," Neurology 61(6):848-850, Lippincott Williams & Wilkins, United States (Sep. 2003).

(56) References Cited

OTHER PUBLICATIONS

Grillini, A., et al., "Eye Movement Evaluation in Multiple Sclerosis and Parkinson's Disease Using a Standardized Oculomotor and Neuro-Ophthalmic Disorder Assessment (SONDA)," Frontiers in Neurology 11:971 1-15, Frontiers Research Foundation, Switzerland (Sep. 2020).

Guri, M., et al., "Brightness: Leaking Sensitive Data from Air-Gapped Workstations via Screen Brightness," IEEE 12th CMI Conference on Cybersecurity and Privacy 7 pages, (2020).

Hasasneh, A., et al., "Deep Learning Approach for Automatic Classification of Ocular and Cardiac Artifacts in Meg Data," Hindawi Journal of Engineering 10 Pages, (Apr. 2018).

Hoffner, S., et al., "Gaze Tracking Using Common Webcams," Osnabruck University, (Feb. 2018).

Holzman, P.S., et al., "Eye-tracking Dysfunctions in Schizophrenic Patients and Their Relatives," Archives of General Psychiatry 31(2):143-151, American Medical Association, United States (Aug. 1974).

Hooge, I.T.C., et al., "Gaze Tracking Accuracy in Humans: One Eye is Sometimes Better Than Two," Behavior Research Methods 51(6):2712-2721, Springer, United States (Dec. 2019).

Hou, L., et al., "Illumination-Based Synchronization of High-Speed Vision Sensors," Sensors 10(6):5530-5547, Basel, Switzerland (2010).

Hutt, S. and D'Mello, S.K., "Evaluating Calibration-free Webcam-based Eye Tracking for Gaze-based User Modeling," ICMI '22: Proceedings of the 2022 International Conference on Multimodal Interaction 224-235, (Nov. 2022).

International Search Report and Written Opinion for Application No. PCT/US2022/027201, mailed on Sep. 19, 2022, 10 pages.

International Search Report and Written Opinion for Application No. PCT/US2022/027312, mailed on Oct. 27, 2022, 10 pages.

Jacobsen, J., "Pupillary Function in Multiple Sclerosis," Acta Neurologica Scandinavica 82(6):392-395, Wiley-Blackwell, Denmark (Dec. 1990).

Jamaludin, S., et al., "Deblurring of Noisy Iris Images in Iris Recognition," Bulletin of Electrical Engineering and Informatics (BEEI) 10(1):156-159, (Feb. 2021).

Joyce, D.S., et al., "Melanopsin-mediated Pupil Function is Impaired in Parkinson's Disease," Scientific Reports 8(1):7796, Nature Publishing Group, United Kingdom (May 2018).

Kelbsch, C., et al., "Standards in Pupillography," Frontiers in Neurology 10(129):1-26, Frontiers Research Foundation, Switzerland (Feb. 2019).

Krafka, K., et al., "Eye Tracking for Everyone," The IEEE Conference on Computer Vision and Pattern Recognition (CVPR) 9 Pages, (Jun. 2016).

Lai, H., et al., "Measuring Saccade Latency Using Smartphone Cameras," IEEE Journal of Biomedical and Health Informatics 24(3):1-13, Institute of Electrical and Electronics Engineers, United States (Mar. 2020).

Liu, G., et al., "A Differential Approach for Gaze Estimation," IEEE transactions on pattern analysis and machine intelligence 43(3):1092-1099, IEEE Computer Society, United States (Mar. 2021).

Liu, J., et al., "Iris Image Deblurring Based on Refinement of Point Spread Function," Chinese Conference on Biometric Recognition (CCBR), Lecture Notes in Computer Science 7701:184-192, (Dec. 2012).

Lizak, N., et al., "Impairment of Smooth Pursuit as a Marker of Early Multiple Sclerosis," Frontiers in Neurology 7(3):206 1-7, Frontiers Research Foundation, Switzerland (Nov. 2016).

Mahanama, B., et al., "Eye Movement and Pupil Measures: a Review," Frontiers in Computer Science 3:733531 1-12, (Jan. 2022).

Matza, L.S., "Multiple Sclerosis Relapse: Qualitative Findings From Clinician and Patient Interviews," Multiple Sclerosis and Related Disorders 27 Pages, Elsevier B. V., Netherlands (Jan. 2019).

Model, D., "A Calibration Free Estimation of the Point of Gaze and Objective Measurement of Ocular Alignment in Adults and Infants," University of Toronto 160 pages, (2011).

Mollers, Maximilian., "Calibration-Free Gaze Tracking an Experimental Analysis," RWTH Aachen University 111 pages, (2007).

Niestroy, A., "Neuro-ophthalmologic Aspects of Multiple Sclerosis: Using Eye Movements as a Clinical and Experimental Tool," Clinical Ophthalmology 1(3):267-272, Dove Medical Press, New Zealand (Sep. 2007).

Park, S., et al., "Few-Shot Adaptive Gaze Estimation," Proceedings of the IEEE/CVF International Conference on Computer Vision (ICCV), 13 pages, (2019).

Patel, A.S., et al., "Optical Axes and Angle Kappa," American Academy of Ophthalmology, (Oct. 2021).

Peysakhovich, V., et al., "The Impact of Luminance on Tonic and Phasic Pupillary Responses to Sustained Cognitive Load," International Journal of Psychophysiology 112:40-45, Elsevier, Netherlands (Feb. 2017).

Pfeuffer, K., et al., "Pursuit Calibration: Making Gaze Calibration Less Tedious and More Flexible," UIST 13 Proceedings of the 26th Annual Acm Symposium on User Interface Software and Technology 261-270, (Oct. 2013).

Pi, J. and Shi, B.E., et al., "Task-embedded Online Eye-tracker Calibration for Improving Robustness to Head Motion," Proceedings of the 11th ACM Symposium on Eye Tracking Research & Applications ETRA '19 8:1-9, (Jun. 2019).

Polak, P.E., et al., "Locus Coeruleus Damage and Noradrenaline Reductions in Multiple Sclerosis and Experimental Autoimmune Encephalomyelitis," Brain 134(Pt 3):665-677, Oxford University Press, United Kingdom (Mar. 2011).

Rasulo, F.A., et al., "Essential Noninvasive Multimodality Neuromonitoring for the Critically III Patient," Critical Care 24(1):100 12 Pages, BioMed Central Ltd, United Kingdom (Mar. 2020).

Rayner, K., "Eye Movements in Reading and Information Processing: 20 Years of Research," Psychological Bulletin 124(3):372-422, American Psychological Association, United States (Nov. 1998).

Rodrigues, A.C., "Response Surface Analysis: A Tutorial for Examining Linear and Curvilinear Effects," Journal of Contemporary Administration 25(6):1-14, (Apr. 2021).

Romero, K., et al., "Neurologists' Accuracy in Predicting Cognitive Impairment in Multiple Sclerosis," Multiple Sclerosis and Related Disorders 4(4):291-295, Elsevier B. V., Netherlands (Jul. 2015).

Schuler, C.J., "Machine Learning Approaches to Image Deconvolution," Dissertation University of Tubingen 142 Pages, Germany (2017).

Schweitzer, R and Rolfs, M., "An Adaptive Algorithm for Fast and Reliable Online Saccade Detection," Behavior Research Methods 52(3):1122-1139, Springer, United States (Jun. 2020).

Serra, A., et al., "Eye Movement Abnormalities in Multiple Sclerosis: Pathogenesis, Modeling, and Treatment," Frontiers in Neurology 9:31 1-7, Frontiers Research Foundation, Switzerland (Feb. 2018).

Serra, A., et al., "Role of Eye Movement Examination and Subjective Visual Vertical in Clinical Evaluation of Multiple Sclerosis," Journal of Neurology 250(5):569-575, Springer-Verlag, Germany (May 2003).

Servillo, G., et al., "Bedside Tested Ocular Motor Disorders in Multiple Sclerosis Patients," Multiple Sclerosis International 2014:732329 1-5, Hindawi Publishing Corporation, Egypt (Apr. 2014).

Sheehy, C.K., et al., "Fixational Microsaccades: a Quantitative and Objective Measure of Disability in Multiple Sclerosis," Multiple Sclerosis 26(3):1-11, SAGE Publications, United Kingdom (Mar. 2020).

Smith, J.D., "Viewpointer: Lightweight Calibration-free Eye Tracking for Ubiquitous Handsfree Deixis," UIST 05: Proceedings of the 18th Annual ACM Symposium on User Interface Software and Technology, 84 pages (2005).

Strobl, M.A.R., et al., "Look Me in the Eye: Evaluating the Accuracy of Smartphone-based Eye Tracking for Potential Application in Autism Spectrum Disorder Research," Biomedical Engineering Online 18(1):51 1-12, BioMed Central, United Kingdom (May 2019).

System and Method for Measuring Delay from Monitor Output to Camera Sensor, Unpublished Disclosure; 16 pages.

(56) References Cited

OTHER PUBLICATIONS

Teikari, P., et al., "Embedded Deep Learning in Ophthalmology: Making Ophthalmic Imaging Smarter," Therapeutic Advances in Ophthalmology 11: 21 Pages, Sage Publications Limited, United States (Mar. 2019).

Tur, C., et al., "Assessing Treatment Outcomes in Multiple Sclerosis Trials and in the Clinical Setting," Nature Reviews. Neurology 14(2):164 Pages, Nature Publishing Group, United Kingdom (Feb. 2018).

Valliappan, N., et al., "Accelerating Eye Movement Research via Accurate and Affordable Smartphone Eye Tracking," Nature Communications 11(1):4553 1-12, Nature Publishing Group, United Kingdom (Sep. 2020).

Valliappan, N., et al., "Accelerating Eye Movement Research via Accurate and Affordable Smartphone Eye Tracking," Supplementary Information, 18 pages, (Jul. 2020).

Van Munset, C.E.P., et al., "Outcome Measures in Clinical Trials for Multiple Sclerosis," CNS Drugs 31(3):217-236, Springer International, New Zealand (Mar. 2017).

Villers-Sidani, E.D., et al., "A Novel Tablet-based Software for the Acquisition and Analysis of Gaze and Eye Movement Parameters: A Preliminary Validation Study in Parkinson's Disease," Frontiers in Neurology 14(1204733):1-10, Frontiers Research Foundation, Switzerland (Jun. 2023).

Villers-Sidani, E.D., et al., "Oculomotor Analysis to Assess Brain Health: Preliminary Findings From a Longitudinal Study of Multiple Sclerosis Using Novel Tablet-based Eye-tracking Software," Frontiers in Neurology 14(1243594): 1-11, Frontiers Research Foundation, Switzerland (Sep. 2023).

Wang, K. and JI, Qiang., "3D Gaze Estimation Without Explicit Personal Calibration," Pattern Recognition 70:216-227, Elsevier, (Jul. 2018).

Williams, B.M., et al., "Fast Blur Detection and Parametric Deconvolution of Retinal Fundus Images," Fetal, Infan and Ophthalmic Medical Image Analysis 8 Pages, Springer, Cham. (2017).

Yang, T., et al., "Gaze Angle Estimate and Correction in Iris Recognition," IEEE Symposium on Computational Intelligence in Biometrics and Identity Management (CIBIM) 7 Pages, (Dec. 2014).

Zammarchi, G., et al., "Application of Eye Tracking Technology in Medicine: a Bibliometric Analysis," Vision 5(4):56 1-14, MDPI AG, Switzerland (Nov. 2021).

Zhang, Y., et al., "Luminance Effects on Pupil Dilation in Speech-in-noise Recognition," PloS one 17(12):e0278506 1-18, Public Library of Science, United States (Dec. 2022).

International Search Report and Written Opinion of the International Searching Authority directed to International Patent Application No. PCT/IB2024/050060, mailed Apr. 3, 2024; 7 pages.

\* cited by examiner

POINT OF GAZE TRACKING WITH INTEGRATED CALIBRATION PROCESS

CROSS-REFERENCE TO RELATED APPLICATION

This application claims the benefit of U.S. Provisional Patent Application No. 63/437,136, filed Jan. 5, 2023, the contents of which are incorporated herein by reference in their entirety.

BACKGROUND

Field

This disclosure is generally directed to techniques for tracking a point of gaze of a subject, and in particular to techniques for tracking a point of gaze of a subject that rely on or otherwise benefit from eye tracking calibration.

Background

Eye tracking may be defined as the process of measuring either the point of gaze of a subject (where a subject is looking) or the angle of the line of sight of an eye relative to the subject's location. A considerable body of research uses eye tracking technology to correlate eye movement with various medical conditions, including neurological conditions.

Testing for a medical condition using eye tracking technology may entail measuring with as much accuracy as possible the point of gaze of a subject versus time for directed oculometric tasks that may include saccades, smooth pursuit, long fixation, or the like. To conduct these types of tests with a sufficient degree of accuracy, eye movements are typically measured in a well-controlled lab setting (e.g., head restrained, controlled ambient light, or other such parameters) using dedicated devices (e.g., infrared eye trackers, pupilometers, or other such devices). However, setting up and maintaining such a controlled test environment may be extremely costly, and may require a significant amount of time and effort. Furthermore, because there exist only a limited number of such well-controlled lab settings, it may be difficult for patients to schedule appointments and/or travel thereto.

SUMMARY

Provided herein are system, apparatus, article of manufacture, method and/or computer program product embodiments, and/or combinations and sub-combinations thereof, for tracking a point of gaze of a subject in a manner that incorporates automatic eye tracking calibration. An example embodiment: obtains video of at least a portion of a face of the subject while the subject is viewing content presented within a display area of a display; analyzes the video to determine a series of time points at which a gaze of the subject is dwelling on a visual target and, for at least each time point in the series of time points, a set of eye features; obtains, for each of the time points in the series of time points, a location of a visual stimulus within the display area of the display; determines a mapping that maps a set of eye features to a point of gaze, wherein the determining is performed based at least on (i) the set of eye features for each of the time points in the series of time points and (ii) the location of the visual stimulus within the display area of the display for each of the time points in the series of time points; and uses the mapping to respectively map one or more sets of eye features obtained by analyzing the video to one or more points of gaze of the subject.

The one or more sets of eye features obtained by analyzing the video may comprise one or more sets of right eye features and the one or more points of gaze of the subject may comprise one or more points of gaze of a right eye of the subject. Alternatively, the one or more sets of eye features obtained by analyzing the video may comprise one or more sets of left eye features and the one or more points of gaze of the subject may comprise one or more points of gaze of a left eye of the subject.

The example embodiment may further operate to detect a neurological or mental health condition of the subject based at least on the one or more points of gaze of the subject.

Obtaining the video of the at least a portion of the face of the subject while the subject is viewing the content presented within the display area of the display may comprise: obtaining the video of the at least a portion of the face of the subject while the subject is performing a directed oculometric task in response to the visual stimulus presented within the display area of the display. The directed oculometric task may comprise, for example, one of a saccade test, a smooth pursuit test, or a long fixation test.

Each set of eye features may comprise one or more of a pupil location relative to an eye opening, eye corner locations of an eye, or a length and an orientation of minor and major elliptical axes of an iris of an eye.

Determining the mapping may comprise performing a regression analysis to determine the mapping. Performing the regression analysis may comprise one of performing a linear regression analysis, performing a polynomial regression analysis, or performing a decision tree regression analysis. Performing the polynomial regression analysis may comprise performing a response surface analysis.

Analyzing the video to determine the set of eye features for each of the time points in the series of time points may comprise extracting an eye image from a frame of the video corresponding to the time point in the series of time points, and providing the eye image to a neural network that, based at least on the eye image, outputs an estimated point of gaze for the time point in the series of time points.

The example embodiment may further operate to: analyze the video to determine one or more additional time points at which the gaze of the subject is dwelling on a visual target and, for each of the one or more additional time points, a set of eye features; obtain, for each of the one or more additional time points, a location of the visual stimulus within the display area of the display; and recalculate the mapping based at least on (i) the set of eye features for each of the one or more additional time points and (ii) the location of the visual stimulus within the display area of the display for each of the one or more additional time points.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Introduction

As noted in the Background section above, eye tracking may be defined as the process of measuring either the point of gaze of a subject (where a subject is looking) or the angle of the line of sight of an eye relative to the subject's location. A considerable body of research uses eye tracking technology to correlate eye movement with various medical conditions, including neurological conditions.

Figure 1A:
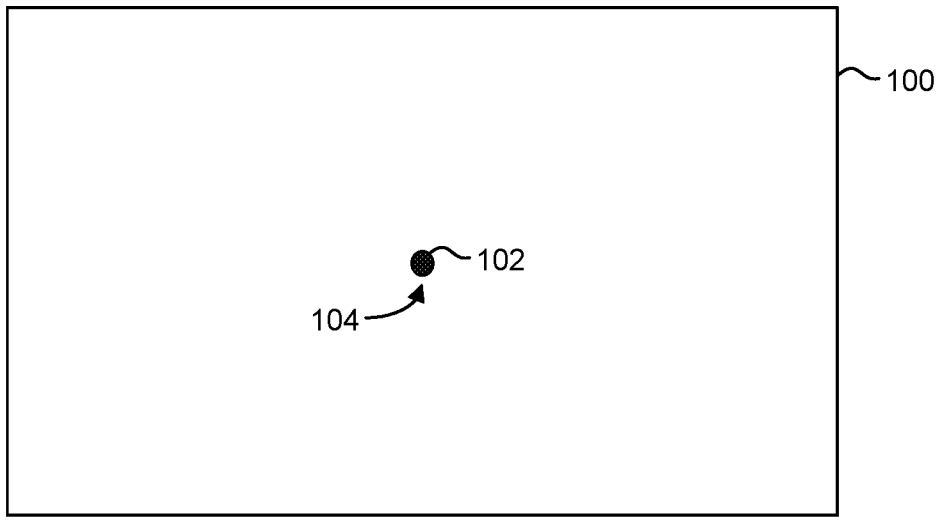
FIGS. 1A and 1B show a display area of a display and a fixation point that is sequentially presented to different locations within the display area as part of a saccade test.
Figure 1B:
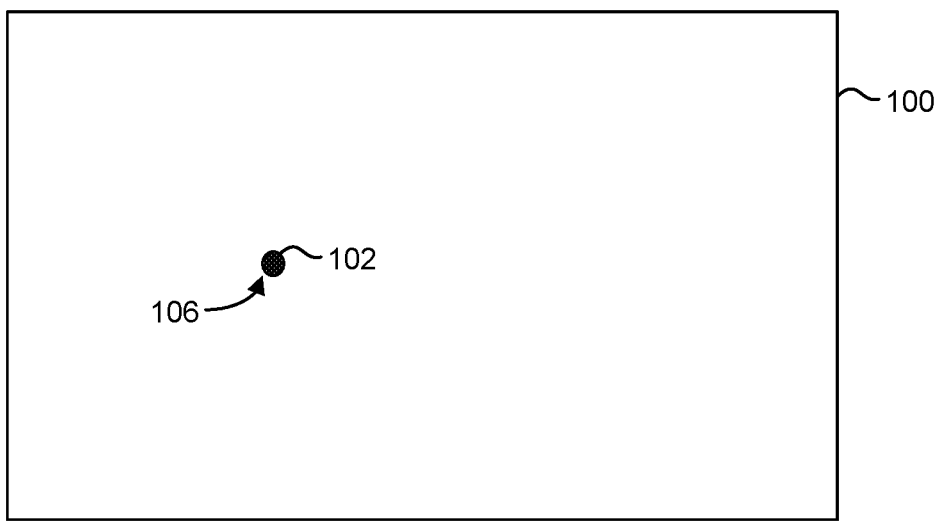

Testing for a medical condition using eye tracking technology may entail measuring with as much accuracy as possible the point of gaze of a subject versus time for directed oculometric tasks that may include saccades, smooth pursuit, long fixation, or the like. For example, a saccade is a rapid movement of the eye between two fixation points. A saccade test measures the ability of a subject to move the eyes from one fixation point to another in a single, quick movement. To help illustrate, FIGS. 1A and 1B show a display area 100 of a display and a fixation point 102 (e.g., a dot) that is sequentially presented to different locations within display area 100 as part of a saccade test. To perform the test, a subject may be instructed to gaze directly at fixation point 102 within display area 100 as fixation point 102 is instantaneously switched from a first location 104 (FIG. 1A) to a second location 106 (FIG. 1B) within display area 100. A full test sequence will typically include rendering multiple similar images in sequence to display area 100 with fixation point 102 appearing in a different location in each image with all of the different locations spanning much of display area 100. Throughout the test sequence, the movement of the eyes of the subject is captured to enable measurement thereof.

To conduct these types of tests with a sufficient degree of accuracy, eye movements are typically measured in a well-controlled lab setting (e.g., head restrained, controlled ambient light, or other such parameters) using dedicated devices (e.g., infrared eye trackers, pupilometers, or other such devices). However, setting up and maintaining such a controlled test environment may be extremely costly, and may require a significant amount of time and effort. Furthermore, because there exist only a limited number of such well-controlled lab settings, it may be difficult for patients to schedule appointments and/or travel thereto.

In order to make the benefits of the aforementioned research more widely available for the detection and treatment of neurological conditions, it would be desirable to make eye tracking very widely available at low cost by, for example, using the ubiquitous cameras in smartphones, tablets, laptop computers, desktop computers, etc., to observe the behavior of eyes in response to visual stimulus.

Features measured in eye images from camera video do not show absolute gaze direction, but only changes in gaze direction. To determine precisely what a subject is looking at, some preliminary calibration procedure is typically performed in which the subject looks at a series of fixation points spanning a display area of a display, while an eye tracker records eye features that correspond to each gaze position. A generalized mapping of eye features to points within the display area may then be calculated from the calibration measurements. The calibrated mapping must accurately capture the details of appearance and behavior in each particular subject and the specifications and geometry of the system used for measurement. The calibrated mapping remains accurate only as long as the relative positions and orientations of the subject, the display, and the camera remain essentially constant. If any of these relative positions and orientations significantly change after the preliminary calibration is completed, then the gaze directions computed using the calibrated mapping will be rendered inaccurate.

The aforementioned preliminary calibration procedure may be cumbersome, uncomfortable, or very difficult to complete. This is especially true with subjects for whom holding their heads still for an extended period of time is very difficult or even impossible due to medical condition, young age, etc. Furthermore, when using a hand-held device such as a smartphone or tablet for eye tracking, frequent recalibration may be necessary because of frequent changes in relative position and orientation of the hand-held device and the subject.

Point of Gaze Tracking with Integrated Calibration Process

Embodiments described herein address some or all of the foregoing issues by tracking a point of gaze of a subject in a manner that incorporates automatic eye tracking calibration. In particular, and as will be described herein, embodiments may: obtain video of the subject while the subject is viewing content presented within a display area of a display, such as while the subject is performing a directed oculometric task in response to a visual stimulus presented within the display area of the display; analyze the video to determine a series of time points at which a gaze of the subject is dwelling on a visual target and, for at least each time point in the series of time points, a set of eye features; obtain, for each of the time points in the series of time points, a location of the visual stimulus within the display area of the display; determine a mapping that maps a set of eye features to a point of gaze based at least on (i) the set of eye features for each of the time points in the series of time points and (ii) the location of the visual stimulus within the display area of the display for each of the time points; and use the mapping to respectively map one or more sets of eye features obtained by analyzing the video to one or more points of gaze of the subject.

Since embodiments described herein can perform eye tracking calibration based, for example, on video of the subject captured during the performance of a test sequence itself, such embodiments eliminate the need to perform the aforementioned preliminary calibration procedure. Furthermore, if the eye tracking calibration is conducted once per test sequence, the relative positions and orientations of the subject, the display, and the camera need to remain essentially constant for only the duration of each test sequence (e.g., 30-60 seconds in some cases) to achieve accurate results. Additionally, if the automatic eye tracking calibration is conducted more than once per test sequence (a feature which may be implemented in certain embodiments), then this time may be even further reduced. Moreover, since embodiments described herein can perform eye tracking calibration once or more during a test sequence, such embodiments can adjust the gaze estimation function based on any changes to the positions/orientations of the subject, display and camera that may have occurred since a previous calibration, thereby improving the overall accuracy of the test results.

In addition to determining the point of gaze of the subject, if the distance from the display to the subject's head is known, embodiments described herein may also compute by trigonometry the angle of the line of sight of an eye relative to the line of sight to a central target from gaze points on the display.

Figure 2:
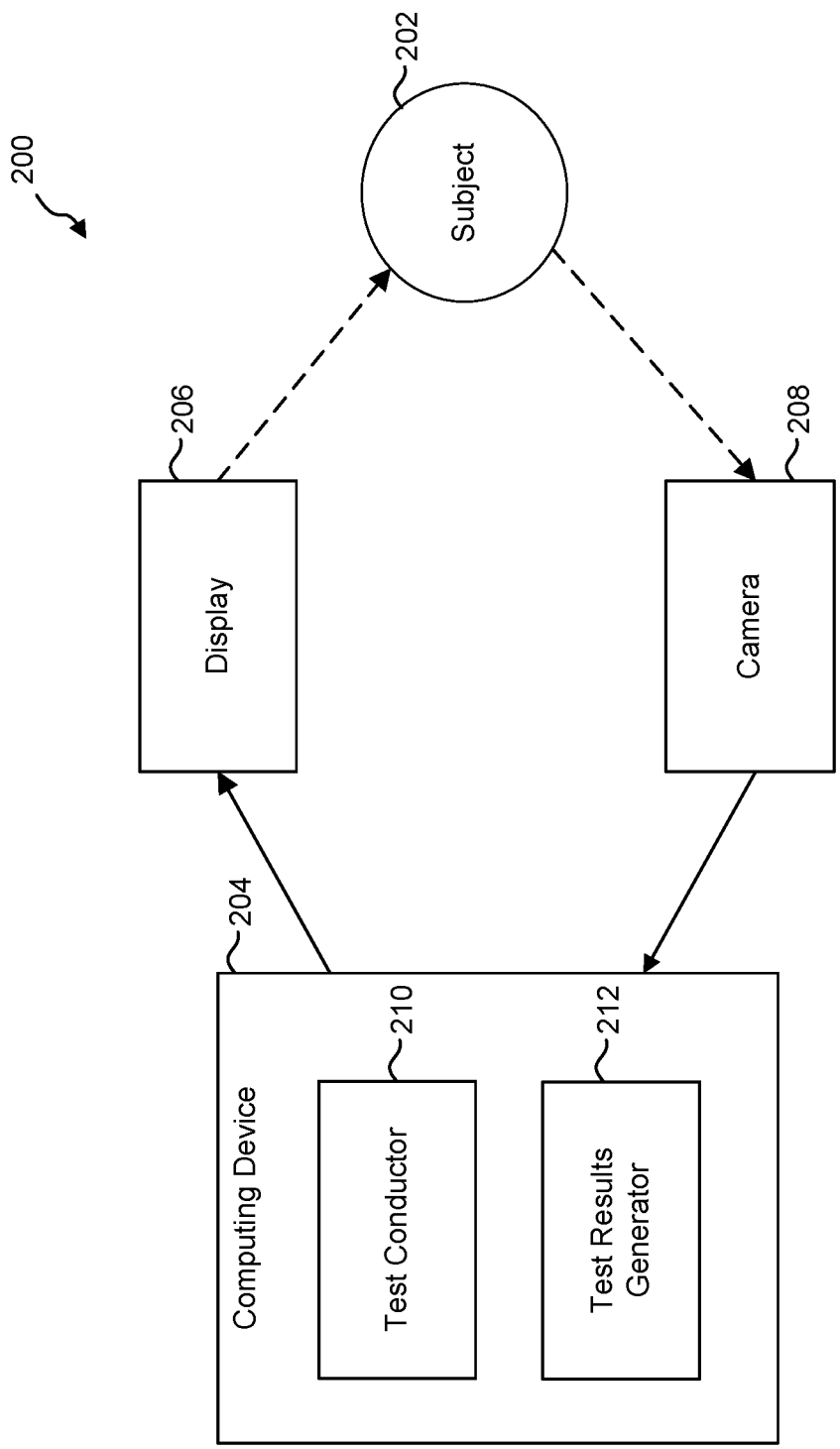
FIG. 2 depicts an example system for tracking a point of gaze of a subject in a manner that incorporates automatic eye tracking calibration, according to some embodiments.

To further illustrate the foregoing concepts, FIG. 2 will now be described. In particular, FIG. 2 depicts an example system 200 for tracking a point of gaze of a subject in a manner that incorporates automatic eye tracking calibration, according to some embodiments. As shown in FIG. 2, system 200 includes a subject 202, a computing device 204, a display 206, and a camera 208. Each of these aspects of system 200 will now be described.

Subject 202 may be a person undergoing oculometric testing. The oculometric test being performed on subject 202 may be designed, for example, to measure an oculomotor ability of subject 202. For example, the oculometric test may be a saccade test that is designed to measure the ability of subject 202 to move the eyes from one designated focal point to another in a single, quick movement. As another example, the oculometric test may be a smooth pursuit test that is designed to measure the ability of subject 202 to accurately track a visual target in a smooth and controlled manner. As yet another example, the oculometric test may comprise a long fixation test that is designed to measure the ability of subject 202 to hold the eyes to a particular spot accurately over a relatively long period of time. However, these are only examples, and other types of oculometric tests may be applied to subject 202 to measure an oculomotor ability thereof.

Conducting the oculometric test may entail directing subject 202 to perform an oculometric task in response to stimulus presented via display 206. For example, as previously discussed, conducting a saccade test may entail directing subject 202 to gaze directly at a fixation point presented within a display area of display 206 as the fixation point is switched between various locations within the display area. As another example, conducting a smooth pursuit test may entail directing subject 202 to follow with their eyes a visual target presented within the display area of display 206 as the visual target moves from one side of the display area to the other in a smooth, predictable motion. In either case, conducting the test may entail sequentially rendering multiple images or frames to display 206, and for this reason a particular test may also be referred to herein as a test sequence.

Computing device 204 may comprise a device that includes one or more processors that are configured to perform at least the functions ascribed to computing device 204 in the following description. The one or more processors may comprise, for example and without limitation, one or more central processing units (CPUs), microcontrollers, microprocessors, signal processors, application-specific integrated circuit (ASICs), and/or other physical hardware processor circuits. By way of example only and without limitation, computing device 204 may comprise a smartphone, a laptop computer, a notebook computer, a tablet computer, a netbook, a desktop computer, a smart television, a video game console, or a wearable device (e.g., a smart watch, smart glasses, or extended reality headset).

Display 206 may comprise a device that is capable of rendering images generated by computing device 204 such that subject 202 may visually perceive them. Display 206 may comprise, for example, a display screen integrated with computing device 204 (e.g., an integrated display of a smartphone, a tablet computer, or a laptop computer) or a monitor that is separate from but connected to computing device 204 (e.g., a monitor connected to a desktop computer via a wired connection). Display 206 may also comprise display panels of a standalone or tethered extended reality headset, or a projector that is capable of projecting an image onto a surface that may be viewable by subject 200. However, the foregoing are only examples of display 206 and still other implementations are possible.

Camera 208 comprises an optical instrument that is capable of capturing and storing images and videos. Camera 208 may comprise, for example, a digital camera that captures images and videos via an electronic image sensor. Camera 208 may be integrated with computing device 204 (e.g., an integrated camera of a smartphone, a tablet computer, or a laptop computer) or may be part of a device that is separate from but connected to computing device 204 (e.g., a USB camera or webcam connected to desktop computer via a wired connection). However, the foregoing are only examples of camera 208 and still other implementations are possible.

As further shown in FIG. 2, computing device 204 comprises a test conductor 210 and a test results generator 212. Each of these components may be implemented by processing logic that can comprise hardware (e.g., circuitry, dedicated logic, programmable logic, microcode, etc.), software (e.g., instructions executed by one or more processors of computing device 204), or a combination thereof. Each of these components will now be described.

Test conductor 210 is configured to conduct a test that involves tracking a point of gaze of a subject, such as subject 202. The test may be conducted, for example and without limitation, to measure an oculomotor ability of subject 202. To conduct the test, test conductor 210 may cause a sequence of images to be presented to subject 202 via display 206, wherein the sequence of images comprise a stimulus visible to subject 202. Subject 202 may be instructed (e.g., by test conductor module 210 and/or a human test administrator) to perform a directed oculometric task in response to the stimulus presented via display 206. As noted above, such directed oculometric task may comprise, for example and without limitation, a saccade test, a smooth pursuit test, or a long fixation test.

Test conductor 210 is further configured to operate camera 208 to capture video of at least a portion of a face of subject 202 while subject 202 is performing the directed oculometric task. Ideally, the video images captured using camera 208 will include both the right eye and the left eye of subject 202, although in accordance with certain embodiments viable test results may still be achieved even if one or both eyes are not captured during some portion(s) of the test. Test conductor 210 is still further configured to store the video captured using camera 208 so that it may be accessed by test results generator 212.

Test results generator 212 is configured to obtain the video captured by test conductor 210 and analyze such video to track the point of gaze of subject 202 (e.g., to measure an oculomotor ability thereof) in a manner that incorporates automatic eye tracking calibration. To achieve this, test results generator 212 may analyze the video captured by test conductor 210 to determine a series of time points at which a gaze of subject 202 is dwelling on a visual target and, for each time point in the series of time points, a set of eye features. For example, test results generator 212 may analyze the video captured by test conductor 210 to determine a series of frames in which a gaze of subject 202 is dwelling on a visual target, and for each frame in the series of frames, a set of eye features.

Figure 3:
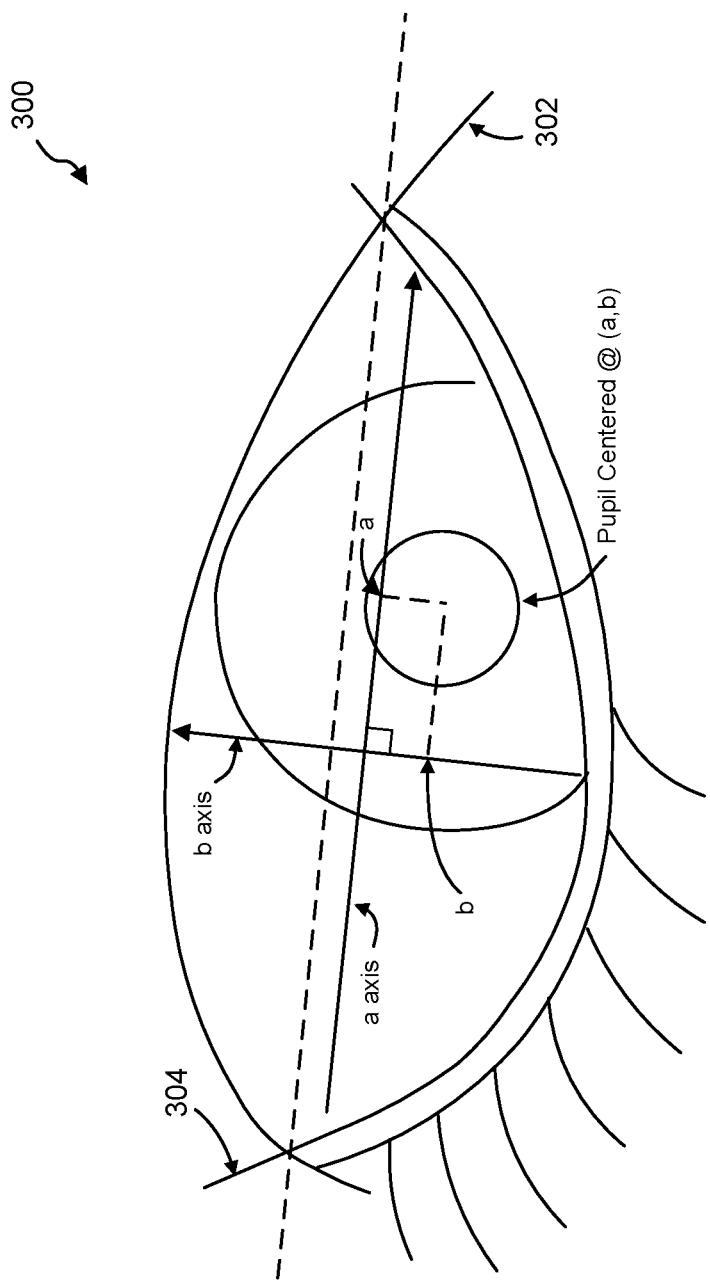
FIG. 3 shows an image of an eye overlaid with markings to illustrate one manner of measuring pupil location relative to the eye opening.

The set of eye features may include, for example and without limitation, a pupil location relative to an eye opening. One example approach for measuring pupil location relative to an eye opening will now be described in reference to FIG. 3. In particular, FIG. 3 shows a close-up eye image 300 overlaid with markings illustrating the measurement of pupil location relative to the eye opening. A first curve 302 approximates the contour of the upper eyelid. A second curve 304 approximates the contour of the lower eyelid. The two curves intersect in two eye corners: one at the extreme inside of the eye opening and one at the extreme outside of the eye opening. A long dashed line is drawn through these two eye corners. The eye opening is defined to be all of the area completely enclosed by the two curves.

In FIG. 3, the variables a and b are used to designate the coordinates of the center of the pupil. The origin, (0,0), is the centroid of the eye opening. The a axis is a line through the origin that is parallel to the long dashed line. The b axis is a line through the origin that is perpendicular to the a axis.

Figure 4A:
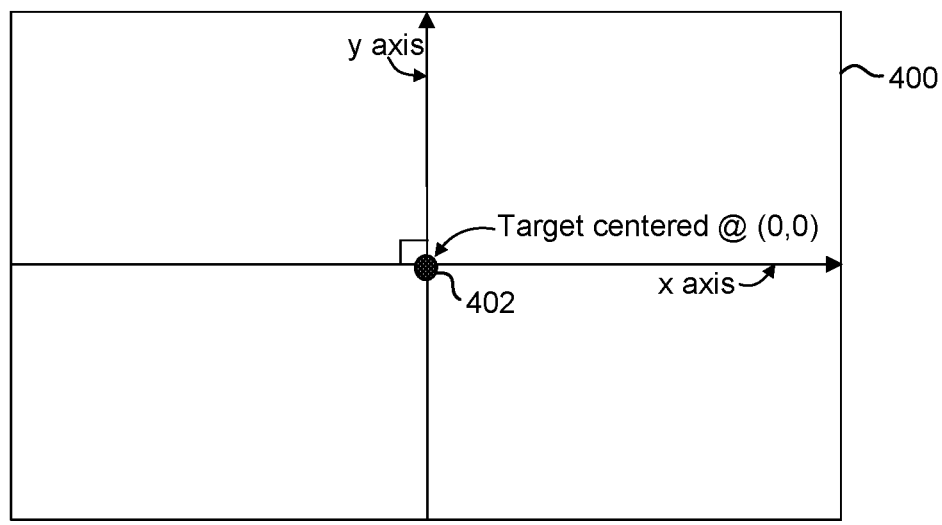
FIGS. 4A and 4B show a display area of a display and a fixation point that is sequentially presented to different locations within the display area as part of a saccade test, along with (x, y) coordinates that denote the location of the fixation point within the display area.
Figure 4B:
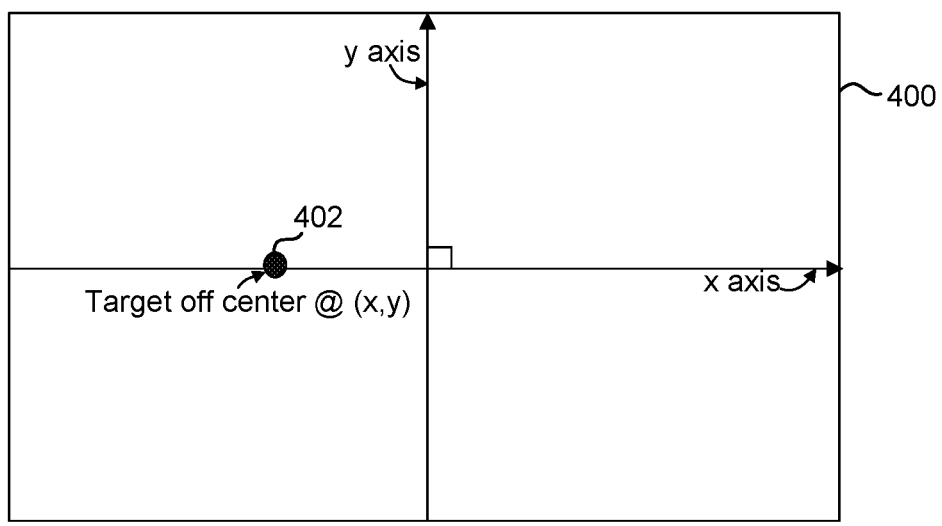

In an embodiment, test results generator 212 is configured to measure (a, b) for a left eye or a right eye visible for each of multiple time points (e.g., frames) in which a gaze of subject 202 is determined to be dwelling on a visual target. Test results generator 212 also obtains a location of a visual stimulus within the display area of display 206 for each of the multiple time points. The corresponding location of the visual stimulus within the display area may be represented using coordinates (x, y), wherein x is the horizontal coordinate and y is the vertical coordinate. By way of example, FIGS. 4A and 4B show a display area 400 of display 206 and a fixation point 402 (e.g., a dot) that may be sequentially presented to different locations thereof as part of a saccade test. In accordance with this example, the location of fixation point 402 at a given point in time (or for a given frame) may be represented using an (x, y) coordinate where x is the horizontal coordinate and y is the vertical coordinate. When fixation point 402 is centered within display area 400, it is at the origin (0, 0). However, this is only one example and any of a wide variety of coordinate systems may be used to represent a location of a stimulus within a display area of display 206.

After obtaining (i) the set of eye features for each of the time points in the series of time points and (ii) the location of the visual stimulus within a display area of display 206 for each of the time points in the series of time points, test results generator 212 may utilize such information to determine a mapping that maps a set of eye features to a point of gaze of the subject.

For example, with continued reference to the above example, test results generator 212 may perform a regression analysis to derive, for each of the left eye and the right eye, a continuous function for x and y with input variables a and b from all of the [(a,b), (x,y)] pairs associated with gaze dwelling on a visual target. It is noted that a single instance or multiple instances of gaze dwelling on a visual target by subject 202 may be utilized to accumulate the aforementioned [(a,b), (x,y)] pairs.

Test results generator 212 may utilize any of a variety of different algorithms to perform the regression analysis. For example, any of multiple known algorithms from the field of supervised machine learning may be used to perform the regression analysis. These include but are not limited to linear regression, polynomial regression, and decision tree regression.

In one embodiment, test results generator 212 utilizes response surface analysis to perform the regression analysis. Response surface analysis is a name for polynomial regression with two input variables and one output variable. For example, in accordance with such an embodiment, test results generator 212 may fit the following two second-degree polynomials to all of the [(a,b), (x,y)] pairs associated with gaze dwelling on a visual target to obtain two response surfaces:

$$x = C_{2,0}a^2 + C_{1,1}ab + C_{0,2}b^2 + C_{1,0}a + C_{0,1}b + C_{0,0}$$

$$y = K_{2,0}a^2 + K_{1,1}ab + K_{0,2}b^2 + K_{1,0}a + K_{0,1}b + K_{0,0}$$

After test results generator 212 determines the coefficients C and K, test results generator 212 may then calculate point of gaze, (x,y), from any single sample, (a,b). In accordance with this example, because there are five C coefficients and five K coefficients, test results generator 212 must have at least five [(a,b), (x,y)] pairs to obtain the two response surfaces. However, test results generator 212 may be configured to use more (e.g., many more) than five [(a,b), (x,y)] pairs to help mitigate the effects of noise.

Once test results generator 212 has determined the aforementioned mapping that maps a set of eye features (e.g., pupil location as represented by (a,b)) to a point of gaze of the subject (e.g., a location in the display area of display 206 represented as (x,y)), test results generator 212 may then apply that mapping to sets of features respectively associated with some or all of the time points (e.g., frames) in the video of the test sequence in which a left eye or right eye is visible to thereby obtain corresponding points of gaze of subject 202 for such time points. These corresponding points of gaze of subject 202 may then be used by test results generator 212 to, for example, measure an oculomotor ability of subject 202.

By way of further illustration, the following is one example algorithm by which test conductor 210 and test results generator 212 may operate together to determine the left and right response surfaces to calculate point of gaze (x,y) for every eye found during a test sequence in accordance with some embodiments.

1. Use continuous face detection and eye finding. For each frame of the video:
   a. If left eye found with high confidence, mark LEF = true, else mark LEF = false.
   b. If right eye found with high confidence, mark REF = true, else mark REF = false.

-continued

2. Put central target on the screen for subject to fix gaze for 2 seconds:
   a. Collect (a,b) for all left eyes found. Set threshold $t_{la}$ = 6 * STD(a). Set threshold $t_{lb}$ = 6 * STD(b).
   b. Collect (a,b) for all right eyes found. Set threshold $t_{ra}$ = 6 * STD(a). Set threshold $t_{rb}$ = 6 * STD(b).
3. Start test sequence and set ACTIVE = true. At end of test sequence, set ACTIVE = false. Let each dwell position last for 48 frames (800 milliseconds)
4. Set up two empty FIFO queues having size = 15 -one for left and one for right- to collect [(a,b), (x,y)] pairs to be examined to find samples associated with subject's gaze dwelling on a target.
5. Setup two empty DATA lists - one for left and one for right -- to collect [(a,b), (x,y)] pairs whenever subject's gaze is dwelling on a target.
6. While ACTIVE:
   a. If LEF:
      i. Push latest [(a,b), (x,y)] from left eye into left FIFO queue.
      ii. If (left FIFO queue is full) and (Max(a) − Min(a)) < $t_{la}$ and (Max(b) − Min(b)) < $t_{lb}$:
         1. If left DATA list empty, add all elements of left FIFO queue to left DATA list, else add latest [(a,b), (x,y)] from left eye to left DATA list.
   b. If REF:
      i. Push latest [(a,b), (x,y)] from right eye into right FIFO queue.
      ii. If (right FIFO queue is full) and (Max(a) − Min(a)) < $t_{ra}$ and (Max(b) − Min(b)) < $t_{rb}$:
         1. If right DATA list empty, add all elements of right FIFO queue to right DATA list, else add latest [(a,b), (x,y)] from right eye to right DATA list.
7. Compute left and right eye response surfaces (x,y) as functions of (a,b) from the left and right DATA lists, respectively.
8. Use the left and right response surfaces to calculate gaze direction (x,y) for every eye found during the whole test sequence.

As noted in step 1 of the algorithm, test results generator 212 continuously applies a face detection and eye finding algorithm to each frame of the video captured by test conductor 210 to find one or more of a left eye or a right eye of subject 202 within each frame. If test results generator 212 determines that a left eye is found with a sufficiently high degree of confidence within a given frame, it will set the variable LEF to true for that frame, otherwise it will set the variable LEF to false for that frame. Likewise, if test results generator 212 determines that a right eye is found with a sufficiently high degree of confidence within a given frame, it will set the variable REF to true for that frame, otherwise it will set the variable REF to false for that frame. The aforementioned face detection and eye finding algorithms may likewise be used to generate cropped images of eyes that are labeled either left or right, provided such eyes are detected within a frame, and these cropped images may subsequently be used for the purposes of determining eye features. Any of a wide variety of well-known techniques for performing face detection and eye finding with respect to an image may be used to implement the foregoing aspects of the example algorithm.

As noted in step 2 of the algorithm, test conductor 210 places a target at the center of the display area of display 206 for 2 seconds so that subject 202 can fix their gaze thereon. Test results generator 212 analyzes the frames captured by camera 208 during this time period to collect (a,b) for each left eye found in the frames and to collect (a,b) for each right eye found in the frames. Any of a variety of well-known techniques for accurately and reliably finding the center of a pupil in an eye image may be utilized to implement this aspect of the example algorithm. In further accordance with step 2 of the algorithm, test results generator 212 then calculates a threshold $t_{la}$ which is equal to 6*STD(a), wherein STD(a) is the standard deviation of a for all left eyes found in the frames captured during the 2 second time period, and a threshold $t_{lb}$ which is equal to 6*STD(b), wherein STD(b) is the standard deviation of b for all left eyes found in the frames captured during the 2 second time period. Likewise, test results generator 212 calculates a threshold $t_{ra}$ which is equal to 6*STD(a), wherein STD(a) is the standard deviation of a for all right eyes found in the frames captured during the 2 second time period, and a threshold $t_{rb}$ which is equal to 6*STD(b), wherein STD(b) is the standard deviation of b for all right eyes found in the frames during the 2 second time period.

Step 2 of the algorithm effectively calculates a range of variation in (a,b) measurements for each eye when the subject is holding a fixed gaze. This range of variation may represent "noise" in the (a,b) measurements, wherein such noise may be caused by variation in the ability of a subject to hold a steady gaze, limitation of algorithms, variation in illumination, limits of camera performance, or other factors. The variation in the ability of a subject to hold a steady gaze may be the largest of the factors contributing to noise. For example, about 2% of the population worldwide has strabismus, a condition that prevents the subject from steadily aligning both eyes on a gaze target. Thus, step 2 of the foregoing algorithm may be used to detect strabismus, allowing some measurements of eye movement to be set aside or interpreted differently.

As noted in step 3 of the algorithm, test conductor 210 starts the test sequence (e.g., starts presenting the visual stimulus for which subject 202 is to perform a directed oculometric task), at which point the variable ACTIVE is set to true. When test conductor 210 concludes the test sequence, the variable ACTIVE is set to false. As further noted in step 3, presenting the visual stimulus may comprise sequentially presenting a dot (or other visual stimulus) to various dwell positions within the display area of display 206 for a particular duration. In this example case, the duration is 48 frames, or 800 milliseconds when camera 208 is operating at 60 frames per second (FPS). It is noted that, to facilitate the correlation of video frames captured using camera 208 with the images presented to the display area of display 206, camera 208 and display 206 may each operate, or be controlled to operate, at the same FPS (e.g., both camera 208 and display 206 may operate at 60 FPS).

As noted in step 4 of the algorithm, test results generator 212 sets up two empty first-in-first-out (FIFO) queues, one for the left eye and one for the right eye, each having the same depth. Test results generator 212 utilizes these FIFO queues to temporarily store [(a,b), (x,y)] pairs that are examined thereby to identify samples captured when the gaze of subject 202 is dwelling on a visual target. In an example embodiment in which both camera 208 and display 206 operate at 60 FPS, a FIFO size of 15 may be selected to support searching for a stable dwell time that is a minimum of 250 milliseconds. The actual real time span required to obtain the 15 samples may be greater because a subject may blink for about 100-300 milliseconds during the 800 milliseconds of target dwell time set in step 3, as previously described.

As noted in step 5 of the algorithm, test results generator 212 also sets up two empty DATA lists, one for the left eye and one for the right eye. Test results generator 212 utilizes these DATA lists to store [(a,b), (x,y)] pairs that have been identified thereby as samples captured when the gaze of subject 202 is dwelling on a visual target.

Step 6 of the algorithm describes a process by which [(a,b), (x,y)] pairs stored in the left eye FIFO queue are selectively added to the corresponding left eye DATA list and by which [(a,b), (x,y)] pairs stored in the right eye FIFO queue are selectively added to the corresponding right eye DATA list. For example, as shown in the algorithm, while ACTIVE is true, for each video frame for which LEF is true, a corresponding [(a,b), (x,y)] pair for the left eye is pushed into the left eye FIFO. If the left eye FIFO queue is full and the (a,b) values stored therein show sufficiently low variation as compared to the previously-determined $t_{1a}$ and $t_{1b}$ values, then any samples in the left eye FIFO queue that haven't already been added to the left eye DATA list are added to the left eye data list. While ACTIVE is true, a similar process is performed with respect to the right eye FIFO queue and the right eye DATA list.

As noted in step 7 of the algorithm, test results generator 212 computes the left eye and right eye response surfaces (x,y) as functions of (a,b) from the left eye and right eye DATA lists respectively. The left eye response surfaces collectively comprise a mapping that maps a set of left eye features (e.g., left eye pupil location as represented by (a,b)) to a point of gaze of a left eye of the subject (e.g., a point of gaze of the left eye of the subject with respect to the display area of display 206 as represented by (x,y)). The right eye response surfaces collectively comprise a mapping that maps a set of right eye features (e.g., right eye pupil location as represented by (a,b)) to a point of gaze of a right eye of the subject (e.g., a point of gaze of the right eye of the subject with respect to the display area of display 206 as represented by (x,y)).

As noted in step 8 of the algorithm, test results generator 212 uses the aforementioned left eye response surfaces and right eye response surfaces to calculate a point of gaze (x,y) for every eye found during the whole test sequence. That is to say, for each eye detected during the test sequence, test results generator 212 may obtain a set of eye features and may utilize the appropriate response surfaces to generate a point of gaze corresponding to the set of eye features.

It is noted that the foregoing algorithm may be modified to periodically or intermittently recalculate the left eye and right eye response surfaces, such that the left eye and right eye response surfaces may be recalculated multiple times during a single test sequence. In accordance with such an implementation, test results generator 212 may be configured to calculate gaze direction (x,y) for a given eye found during the test sequence using the most recently calculated response surfaces.

Although, in the foregoing description, test conductor 210 and test results generator 212 are described as being part of the same computing device (i.e., computing device 204), these components need not be implemented on the same computing device. For example, test conductor 210 may be implemented on a first computing device (e.g., a smartphone, a tablet, or a laptop computer) and test results generator 212 may be implemented on a second computing device (e.g., a server in a cloud computing network) that is communicatively connected thereto. In accordance with such a distributed implementation, test conductor 210 may conduct an oculometric test in the manner described above and then upload or otherwise make available to the second computing device the video of the subject taking the oculometric test. Test results generator 212 executing on the second computing device may then analyze the video to track the point of gaze of the subject in the manner described above to determine the results of the oculometric test.

Additionally, test conductor 210 and test results generator 212 may concurrently operate to conduct an oculometric test. For example, video of subject 202 captured by test conductor 210 while conducting the oculometric test may be made accessible (e.g., streamed) to test results generator 212 in near real time, and test results generator 212 may analyze such video to track the point of gaze of the subject in the manner described above to determine the results of the oculometric test. However, test conductor 210 and test results generator 212 may also operate at disparate times to conduct an oculometric test. For example, test conductor 212 may conduct an oculometric test in the manner described above and then store for later analysis the video of the subject taking the oculometric test. Then, at some later time (e.g., minutes, hours or days later), test results generator 212 may access and analyze the video to track the point of gaze of the subject in the manner described above to determine the results of the oculometric test.

In certain embodiments, the automatic eye tracking calibration performed by test results generator 212 may be performed in a manner that compensates for a change in position and orientation of subject 202. For example, test results generator 212 may use, in addition to pupil location relative to eye opening, the location of the eye corners of both eyes in the field of view of the camera to bring information about the position and orientation of the subject into the calculation of the point of gaze (x,y). This may be achieved, for example, by adding terms dependent on the 4×2=8 coordinates of the eye corners to the above second-degree polynomial equations for x and y of each eye. This will increase the number of coefficients C and K to some number, N. Consequently, test results generator 212 may process whatever number of video frame images is required to obtain at least N frames from which all input variables—(a,b) from both eyes and the corresponding 8 eye corner coordinates—may be extracted. Test results generator 212 may then compute the C and K coefficients by regression analysis.

It has been observed that the shape of the pupil and iris in an eye image change with gaze direction by the subject and angle of the camera view of the eye. The iris shape may be a better choice for estimating gaze angle because the relatively smaller pupil may more easily be occluded by an eyelid or appear misshapen due to insufficient camera resolution. For example, an ellipse may be fitted to the iris-sclera boundary in an eye image. The length and orientation of the minor and major elliptical axes of the iris may be used to estimate gaze angle relative to the optical axis of the camera. Thus, similar to the way in which eye corner locations may be used to refine the second-degree polynomial equations for x and y of each eye, additional terms dependent on the length and orientation of these axes may also be added. As with added eye corner information, N will increase and a sufficiently greater number of frames must be analyzed. Consequently, test results generator 212 may process whatever number of video frame images is required to obtain at least the sufficiently greater number of frames from which all input variables—(a,b) from both eyes, the corresponding 8 eye corner coordinates, and the length and orientation of the minor and major elliptical axes of the eyes—may be extracted. Test results generator 212 may then compute the C and K coefficients by regression analysis.

It is noted that either or both of eye corner or iris shape information may be added to the input variables for mapping to the (x,y) gaze coordinates in order to compensate for change in position and orientation of the subject.

Figure 5:
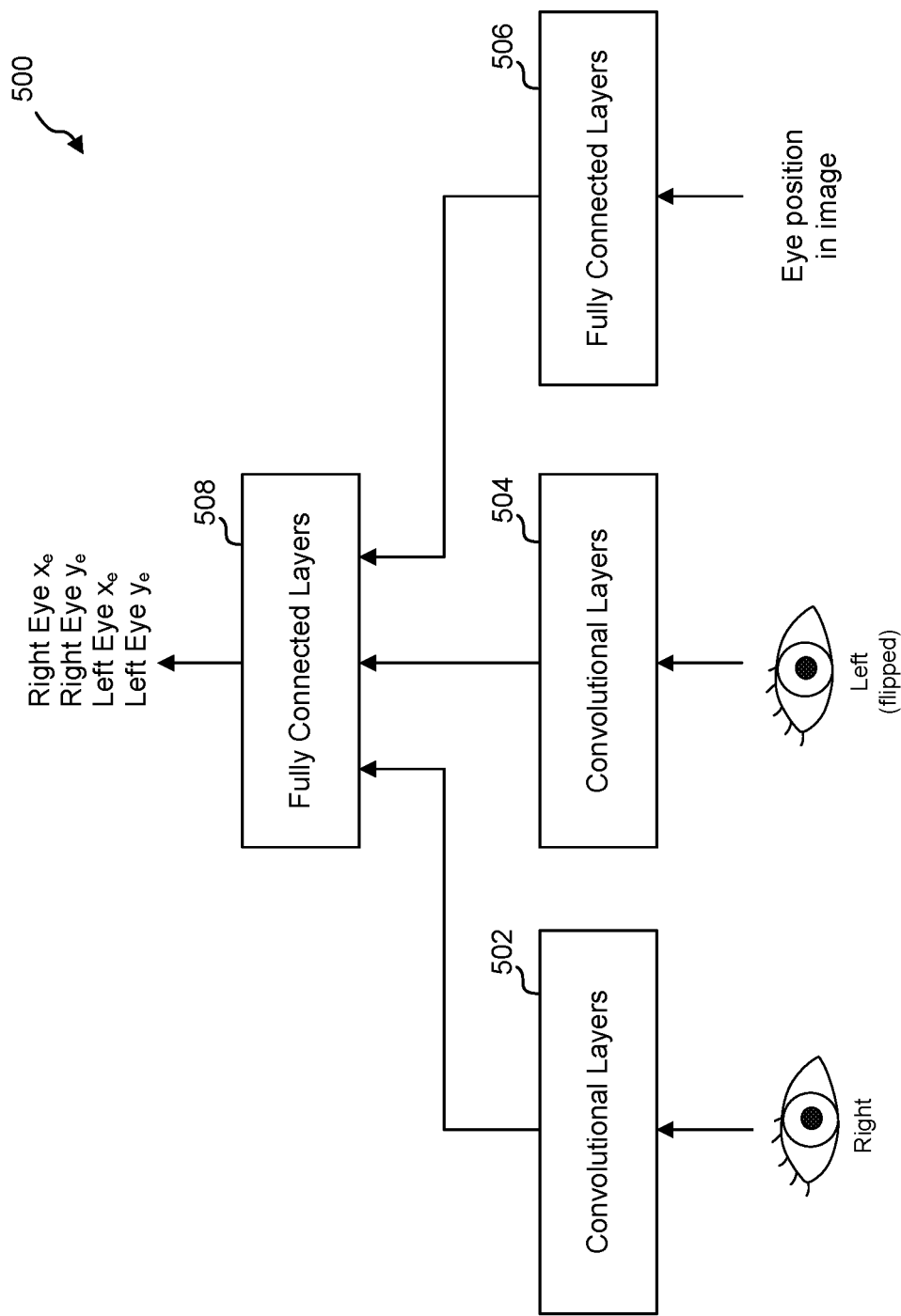
FIG. 5 shows a neural network that may be used to obtain estimated right and left eye coordinates based at least on right and left eye images, according to some embodiments.

As discussed above in regard to step 1 of the example algorithm, test results generator 212 may use face detection and eye finding to generate cropped images of eyes that are labeled either left or right. Test results generator 212 may accomplish this by using a convolutional neural network (CNN). Furthermore, instead of processing these images to extract the (a,b) measurements as described above, the left and right eye images may be fed into two separate copies of a CNN that has been trained to estimate the gaze location within the display area of display 206. The gaze estimation CNN may have been trained with a data set of diverse face images from many people with many gaze angles. These two gaze estimation CNNs may be combined with an eye finding CNN to construct a neural network 500 depicted in FIG. 5. As shown in FIG. 5, a right eye image may be input to convolutional layers 502 (which may also include one or more pooling layers), a left eye image may be input to convolutional layers 504 (which may also include one or more pooling layers), and one or two eye positions may be input to fully connected layers 506. The outputs from convolutional layers 502, convolutional layers 504 and fully connected layers 506 may be passed to fully connected layers 508. Fully connected layers 508 may output estimated right and left eye coordinates ($x_e$, $y_e$), which may be used by test results generator 212 to determine the right and left eye response surfaces as will be described below.

For example, an estimated point of gaze within the display area of display 206 generated by neural network 500 may be designated ($x_e$, $y_e$). Furthermore, the response surface analysis equations above may be rewritten as:

$$x = C_{2,0}x_e^2 + C_{1,1}x_ey_e + C_{0,2}y_e^2 + C_{1,0}x_e + C_{0,1}y_e + C_{0,0}$$
$$y = K_{2,0}x_e^2 + K_{1,1}x_ey_e + K_{0,2}y_e^2 + K_{1,0}x_e + K_{0,1}y_e + K_{0,0}$$

With these modifications, test results generator 212 may utilize the aforementioned algorithm to generate the right and left eye response surfaces, except that all (a, b) references are replaced by ($x_e$, $y_e$) references.

The foregoing techniques for tracking the point of gaze of a subject may be used to perform oculometric testing for the purpose of detecting a neurological or mental health condition of the subject. However, the foregoing techniques may also be used in a wide variety of other eye tracking applications that may involve or benefit from tracking the point of gaze of a subject. Such applications may include but are by no means limited to applications in the area of marketing, human-computer interaction, or virtual and augmented reality, or any application for which dwell positions may be included in the application content presented on the display.

Figure 6:
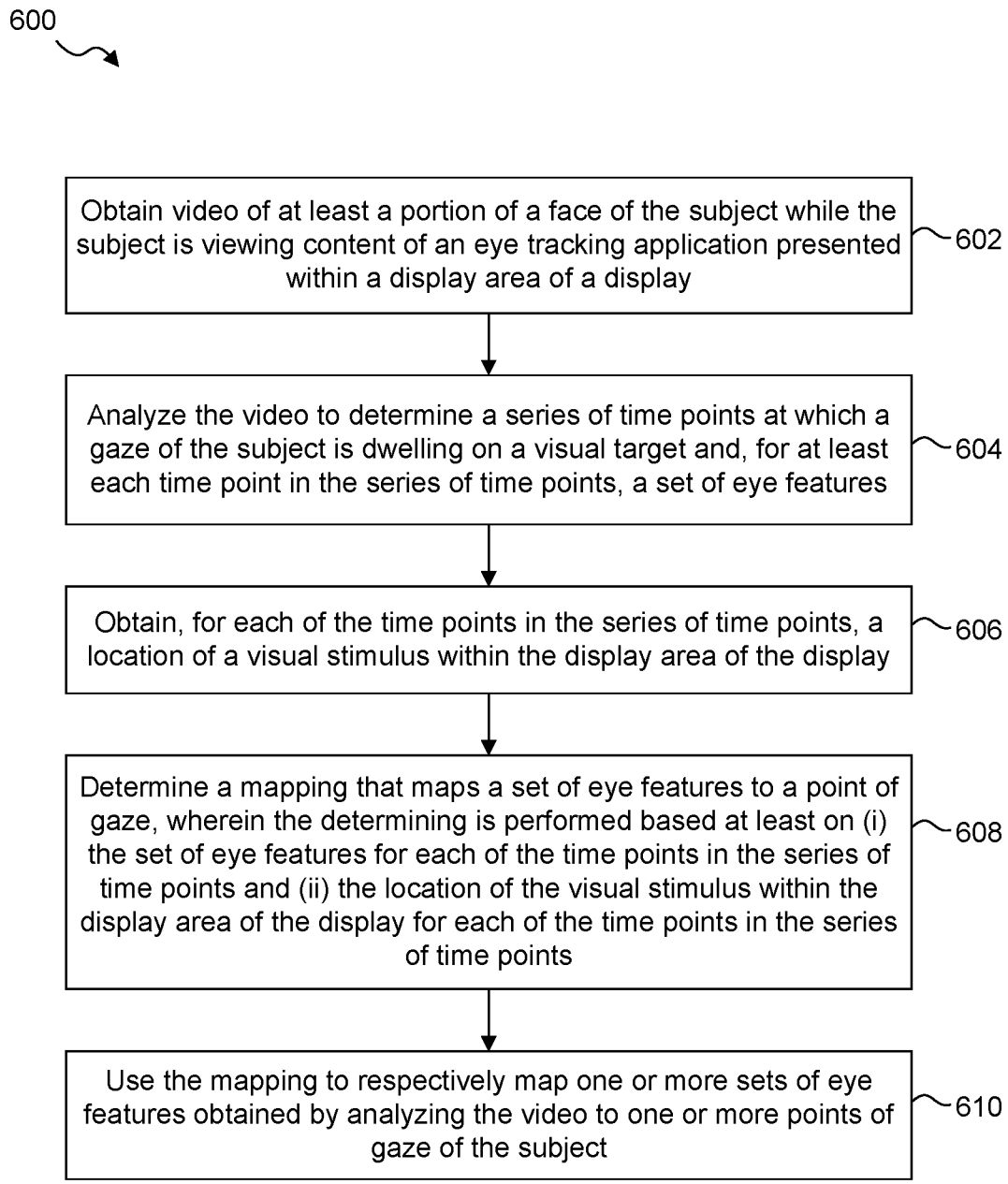
FIG. 6 is a flow diagram of a method for tracking a point of gaze of a subject in a manner that incorporates automatic eye tracking calibration, according to some embodiments.

FIG. 6 is a flow diagram of a method 600 for tracking a point of gaze of a subject in a manner that incorporates automatic eye tracking calibration, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to system 200 of FIG. 2, although method 600 is not limited to that embodiment.

In 602, test conductor 210 uses camera 208 to obtain video of at least a portion of a face of subject 202 while subject 202 is viewing content of an eye tracking application within a display area of display 206. The eye tracking application may comprise, for example, and without limitation, an oculometric testing application that performs eye tracking while subject 202 performs a directed oculometric task. For example, test conductor 210 may use camera 208 to obtain video of at least a portion of the face of subject 202 while subject 202 is performing a directed oculometric task in response to a visual stimulus presented within the display area of display 206. Such directed oculometric task may comprise, for example, a saccade test, a smooth pursuit test, or a long fixation test. However, it is noted that the eye tracking application may comprise an eye tracking application in the area of marketing, human-computer interaction, or virtual and augmented reality, or any application for which dwell positions may be included in the application content presented by display 206.

In 604, test results generator 212 analyzes the video to determine a series of time points at which a gaze of subject 202 is dwelling on a visual target and, for each time point in the series of time points, a set of eye features. Each set of eye features may comprise, for example, a set of right eye features or a set of left eye features. Furthermore, each set of eye features may comprise one or more of a pupil location relative to an eye opening, eye corner locations of an eye, or a length and an orientation of minor and major elliptical axes of an iris of an eye.

In an embodiment, test results generator 212 may analyze the video to determine the set of eye features for each of the time points in the series of time points by extracting an eye image from a frame of the video corresponding to the time point in the series of time points and providing the eye image to a neural network that, based at least on the eye image, outputs an estimated eye gaze direction for the time point in the series of time points.

In 606, test results generator 212 obtains, for each of the time points in the series of time points, a location of a visual stimulus within the display area of display 206.

In 608, test results generator 212 determines a mapping that maps a set of eye features to a point of gaze, wherein the determining is performed based at least on (i) the set of eye features for each of the time points in the series of time points and (ii) the location of the visual stimulus within the display area of display 206 for each of the time points in the series of time points.

Test results generator 212 may determine the mapping by performing a regression analysis. By way of example, test results generator 212 may perform one of a linear regression analysis, a polynomial regression analysis, or a decision tree regression analysis to determine the mapping. In further accordance with an example embodiment in which test results generator 212 performs a polynomial regression analysis to determine the mapping, test results generator 212 may perform a response surface analysis to determine the mapping.

In 610, test results generator 212 uses the mapping to respectively map one or more sets of eye features obtained by analyzing the video to one or more points of gaze of subject 202. If the one or more sets of eye features comprise one or more sets of right eye features, then the one or more points of gaze will comprise one or more points of gaze of a right eye of subject 202. Likewise, if the one or more sets of eye features comprise one or more sets of left eye features, then the one or more points of gaze will comprise one or more points of gaze of a left eye of subject 202. In certain implementations, test results generator 212 may detect a neurological or mental health condition of subject 202 based at least on the one or more points of gaze of the subject determined in 610.

Figure 7:
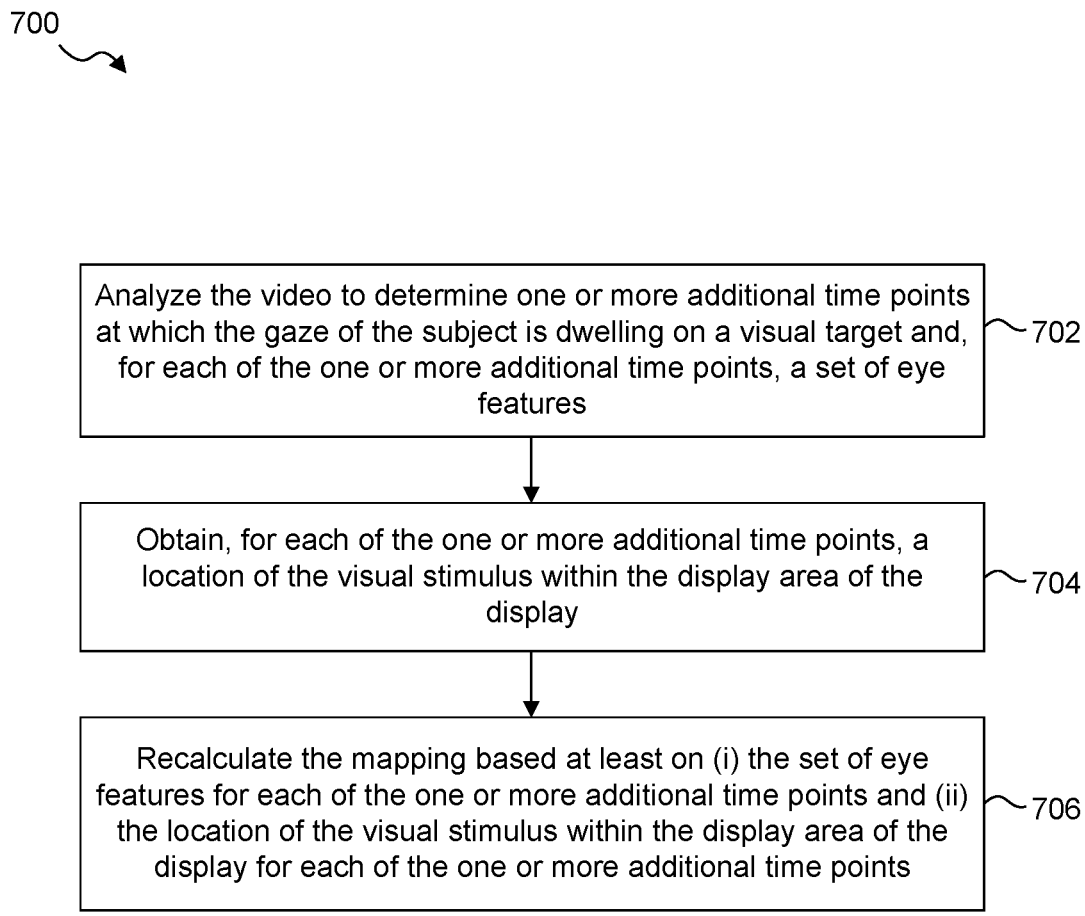
FIG. 7 is a flow diagram of a method for recalculating a mapping that maps a set of eye features to a point of gaze, according to some embodiments.

FIG. 7 is a flow diagram of a method 700 for recalculating a mapping that maps a set of eye features to a point of gaze, according to some embodiments. Like method 600, method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with continued reference to system 200 of FIG. 2, although method 700 is not limited to that embodiment.

Method 700 may be performed after the steps of method 600 are performed. In 702, test results generator 212 analyzes the video obtained in 602 to determine one or more additional time points at which the gaze of subject 202 is dwelling on a visual target and, for each of the one or more additional time points, a set of eye features.

In 704, test results generator 212 obtains, for each of the one or more additional time points, a location of the visual stimulus within the display area of display 206.

In 706, test results generator 212 recalculates the mapping that was previously determined in 608 based at least on (i) the set of eye features for each of the one or more additional time points and (ii) the location of the visual stimulus within the display area of display 206 for each of the one or more additional time points.

EXAMPLE COMPUTER SYSTEM

Figure 8:
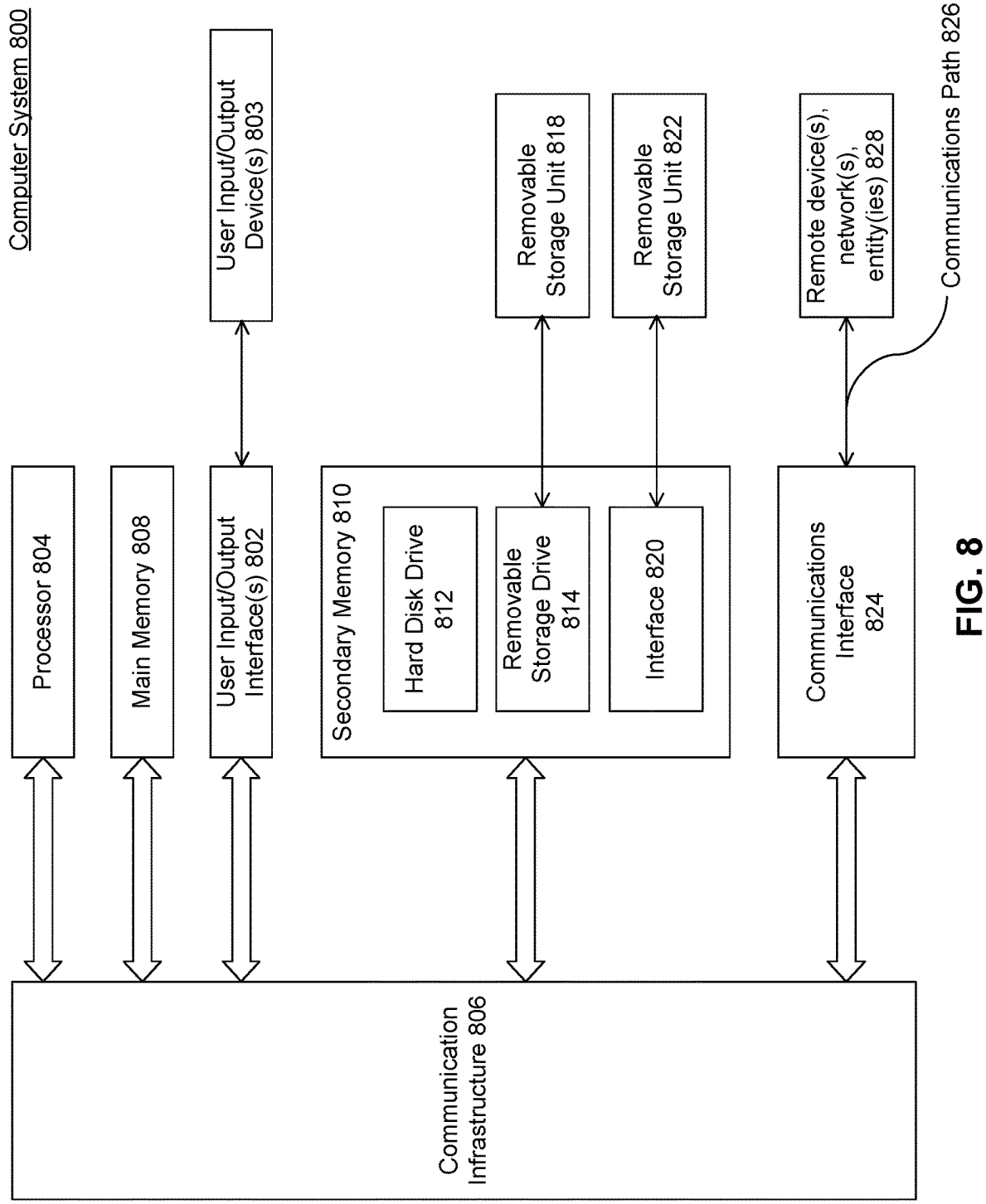
FIG. 8 illustrates an example computer system useful for implementing various embodiments.

Various embodiments may be implemented, for example, using one or more well-known computer systems, such as computer system 800 shown in FIG. 8. For example, computing device 204 may be implemented using combinations or sub-combinations of computer system 800. Also or alternatively, one or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800 or processor(s) 804), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for tracking a point of gaze of a subject, comprising:
    obtaining, by at least one computer processor, video of at least a portion of a face of the subject while the subject is viewing content of a test sequence presented within a display area of a display, wherein an integrated calibration process is performed during the test sequence, the integrated calibration process comprising:
        determining, by analyzing the video a series of time points at which a gaze of the subject is dwelling on a visual target and, for at least each time point in the series of time points, a corresponding set of eye features;
        after determining the series of time points, obtaining, for each of the time points in the series of time points, a location of a visual stimulus presented within the display area of the display; and
        determining a mapping that maps a set of eye features to a point of gaze, wherein the determining is performed based at least on (i) the set of eye features for each of the time points in the series of time points and (ii) the location of the visual stimulus within the display area of the display for each of the time points in the series of time points; and
    using the mapping to respectively map one or more sets of eye features to one or more points of gaze of the subject.

2. The computer-implemented method of claim 1, wherein:
    the one or more sets of eye features obtained by analyzing the video comprises one or more sets of right eye features and the one or more points of gaze of the subject comprises one or more points of gaze of a right eye of the subject; or the one or more sets of eye features obtained by analyzing the video comprises one or more sets of left eye features and the one or more points of gaze of the subject comprises one or more points of gaze of a left eye of the subject.

3. The computer-implemented method of claim 1, further comprising:
detecting a neurological or mental health condition of the subject based at least on the one or more points of gaze of the subject.

4. The computer-implemented method of claim 1, wherein obtaining the video of the at least a portion of the face of the subject while the subject is viewing the content of the test sequence presented within the display area of the display comprises:
obtaining the video of the at least a portion of the face of the subject while the subject is performing a directed oculometric task in response to the visual stimulus presented within the display area of the display.

5. The computer-implemented method of claim 4, wherein the directed oculometric task comprises one of:
a saccade test;
a smooth pursuit test; or
a long fixation test.

6. The computer-implemented method of claim 1, wherein each set of eye features comprises one or more of:
a pupil location relative to an eye opening;
eye corner locations of an eye; or
a length and an orientation of minor and major elliptical axes of an iris of an eye.

7. The computer-implemented method of claim 1, wherein determining the mapping comprises:
performing a regression analysis to determine the mapping.

8. The computer-implemented method of claim 7, wherein performing the regression analysis to determine the mapping comprises one of:
performing a linear regression analysis;
performing a polynomial regression analysis; or
performing a decision tree regression analysis.

9. The computer-implemented method of claim 1, wherein analyzing the video to determine, for each of the time points in the series of time points, the set of eye features comprises:
extracting an eye image from a frame of the video corresponding to the time point in the series of time points; and
providing the eye image to a neural network that, based at least on the eye image, outputs an estimated point of gaze for the time point in the series of time points.

10. The computer-implemented method of claim 1, wherein the integrated calibration process further comprising:
analyzing the video to determine one or more additional time points at which the gaze of the subject is dwelling on a visual target and, for each of the one or more additional time points, a set of corresponding eye features;
obtaining, for each of the one or more additional time points, a location of the visual stimulus within the display area of the display; and
recalculating the mapping based at least on (i) the set of eye features for each of the one or more additional time points and (ii) the location of the visual stimulus within the display area of the display for each of the one or more additional time points.

11. A system for measuring tracking a point of gaze of a subject, comprising:
one or more memories; and
at least one processor each coupled to at least one of the memories and configured to perform operations comprising:
obtaining video of at least a portion of a face of the subject while the subject is viewing content of a test sequence presented within a display area of a display, wherein an integrated calibration process is performed during the test sequence, the integrated calibration process comprising:
determining, by analyzing the video a series of time points at which a gaze of the subject is dwelling on a visual target and, for at least each time point in the series of time points, a corresponding set of eye features;
after determining the series of time points, obtaining, for each of the time points in the series of time points, a location of a visual stimulus presented within the display area of the display; and
determining a mapping that maps a set of eye features to a point of gaze, wherein the determining is performed based at least on (i) the set of eye features for each of the time points in the series of time points and (ii) the location of the visual stimulus within the display area of the display for each of the time points in the series of time points; and
using the mapping to respectively map one or more sets of eye features to one or more points of gaze of the subject.

12. The system of claim 11, wherein:
the one or more sets of eye features obtained by analyzing the video comprises one or more sets of right eye features and the one or more points of gaze of the subject comprises one or more points of gaze of a right eye of the subject; or
the one or more sets of eye features obtained by analyzing the video comprises one or more sets of left eye features and the one or more points of gaze of the subject comprises one or more points of gaze of a left eye of the subject.

13. The system of claim 11, wherein the operations further comprise:
detecting a neurological or mental health condition of the subject based at least on the one or more points of gaze of the subject.

14. The system of claim 11, wherein obtaining the video of the at least a portion of the face of the subject while the subject is viewing the content of the test sequence presented within the display area of the display comprises:
obtaining the video of the at least a portion of the face of the subject while the subject is performing a directed oculometric task in response to the visual stimulus presented within the display area of the display.

15. The system of claim 14, wherein the directed oculometric task comprises one of:
a saccade test;
a smooth pursuit test; or
a long fixation test.

16. The system of claim 11, wherein each set of eye features comprises one or more of:
a pupil location relative to an eye opening;
eye corner locations of an eye; or a length and an orientation of minor and major elliptical axes of an iris of an eye.

17. The system of claim 11, wherein determining the mapping comprises:
performing a regression analysis to determine the mapping.

18. The system of claim 17, wherein performing the regression analysis to determine the mapping comprises one of:
performing a linear regression analysis;
performing a polynomial regression analysis; or
performing a decision tree regression analysis.

19. The system of claim 11, wherein analyzing the video to determine, for each of the time points in the series of time points, the set of eye features comprises:
extracting an eye image from a frame of the video corresponding to the time point in the series of time points; and
providing the eye image to a neural network that, based at least on the eye image, outputs an estimated point of gaze for the time point in the series of time points.

20. The system of claim 11, wherein the integrated calibration process further comprises:
analyzing the video to determine one or more additional time points at which the gaze of the subject is dwelling on a visual target and, for each of the one or more additional time points, a set of corresponding eye features;
obtaining, for each of the one or more additional time points, a location of the visual stimulus within the display area of the display; and
recalculating the mapping based at least on (i) the set of eye features for each of the one or more additional time points and (ii) the location of the visual stimulus within the display area of the display for each of the one or more additional time points.

21. A non-transitory computer-readable medium having instructions stored thereon that, when executed by at least one computer processor, cause the at least one computer processor to perform operations for tracking a point of gaze of a subject, the operations comprising:
obtaining video of at least a portion of a face of the subject while the subject is viewing content of a test sequence presented within a display area of a display, wherein an integrated calibration process is performed during the test sequence, the integrated calibration process comprising:
determining, by analyzing the video a series of time points at which a gaze of the subject is dwelling on a visual target and, for at least each time point in the series of time points, a corresponding set of eye features;
after determining the series of time points, obtaining, for each of the time points in the series of time points, a location of a visual stimulus presented within the display area of the display; and
determining a mapping that maps a set of eye features to a point of gaze, wherein the determining is performed based at least on (i) the set of eye features for each of the time points in the series of time points and (ii) the location of the visual stimulus within the display area of the display for each of the time points in the series of time points; and
using the mapping to respectively map one or more sets of eye features to one or more points of gaze of the subject.

22. The non-transitory computer-readable medium of claim 21, wherein:
the one or more sets of eye features obtained by analyzing the video comprises one or more sets of right eye features and the one or more points of gaze of the subject comprises one or more points of gaze of a right eye of the subject; or
the one or more sets of eye features obtained by analyzing the video comprises one or more sets of left eye features and the one or more points of gaze of the subject comprises one or more points of gaze of a left eye of the subject.

23. The non-transitory computer-readable medium of claim 21, wherein the operations further comprise:
detecting a neurological or mental health condition of the subject based at least on the one or more points of gaze of the subject.

24. The non-transitory computer-readable medium of claim 21, wherein obtaining the video of the at least a portion of the face of the subject while the subject is viewing the content of the test sequence presented within the display area of the display comprises:
obtaining the video of the at least a portion of the face of the subject while the subject is performing a directed oculometric task in response to the visual stimulus presented within the display area of the display.

25. The non-transitory computer-readable medium of claim 24, wherein the directed oculometric task comprises one of:
a saccade test;
a smooth pursuit test; or
a long fixation test.

26. The non-transitory computer-readable medium of claim 21, wherein each set of eye features comprises one or more of:
a pupil location relative to an eye opening;
eye corner locations of an eye; or
a length and an orientation of minor and major elliptical axes of an iris of an eye.

27. The non-transitory computer-readable medium of claim 21, wherein determining the mapping comprises:
performing a regression analysis to determine the mapping.

28. The non-transitory computer-readable medium of claim 27, wherein performing the regression analysis to determine the mapping comprises one of:
performing a linear regression analysis;
performing a polynomial regression analysis; or
performing a decision tree regression analysis.

29. The non-transitory computer-readable medium of claim 21, wherein analyzing the video to determine, for each of the time points in the series of time points, the set of eye features comprises:
extracting an eye image from a frame of the video corresponding to the time point in the series of time points; and
providing the eye image to a neural network that, based at least on the eye image, outputs an estimated point of gaze for the time point in the series of time points.

30. The non-transitory computer-readable medium of claim 21, wherein the integrated calibration process comprises:
analyzing the video to determine one or more additional time points at which the gaze of the subject is dwelling on a visual target and, for each of the one or more additional time points, a set of corresponding eye features;

obtaining, for each of the one or more additional time points, a location of the visual stimulus within the display area of the display; and recalculating the mapping based at least on (i) the set of eye features for each of the one or more additional time points and (ii) the location of the visual stimulus within the display area of the display for each of the one or more additional time points.

\* \* \* \* \*